Figure 3:
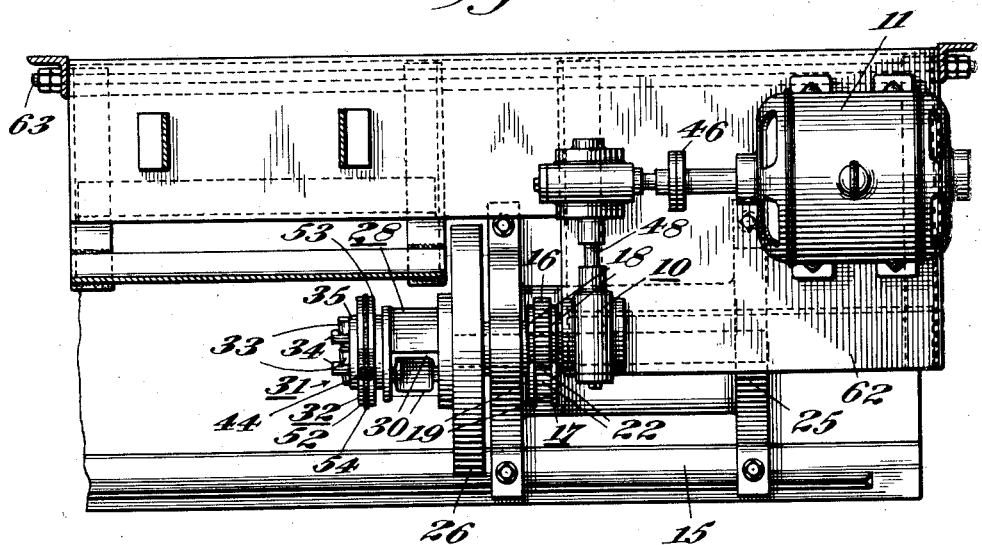

May 8, 1934.   G. S. COMSTOCK   1,957,489
ARC WELDING MACHINE
Filed March 4, 1931    5 Sheets-Sheet 1
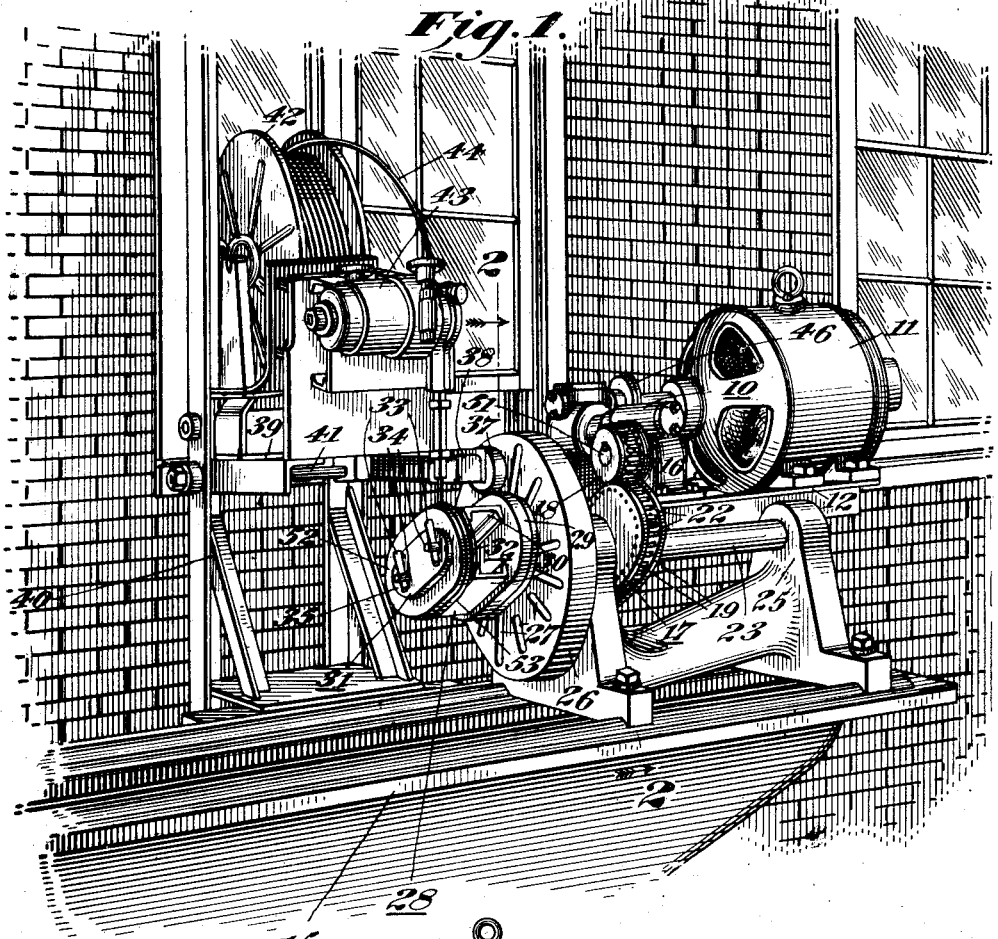
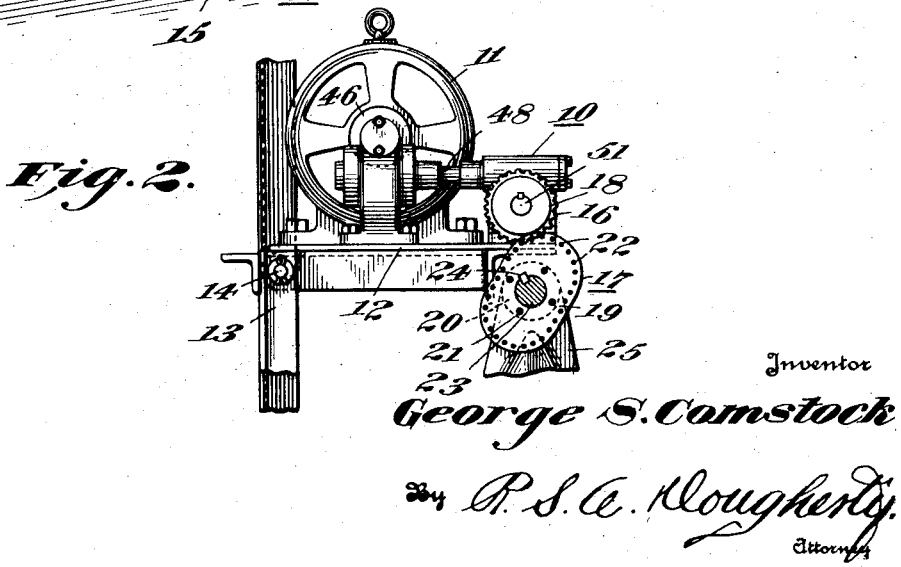

May 8, 1934.  G. S. COMSTOCK  1,957,489
ARC WELDING MACHINE
Filed March 4, 1931  5 Sheets-Sheet 2

Inventor
George S. Comstock
By P. S. C. Dougherty
Attorney

May 8, 1934.  G. S. COMSTOCK  1,957,489
ARC WELDING MACHINE
Filed March 4, 1931   5 Sheets-Sheet 3
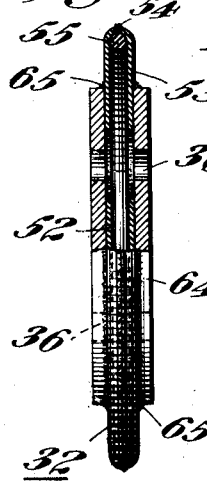
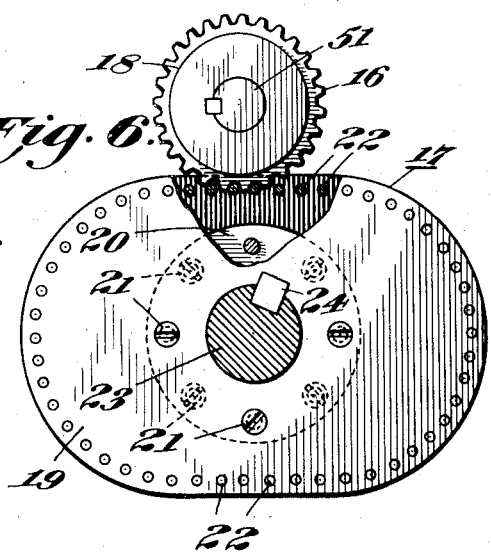
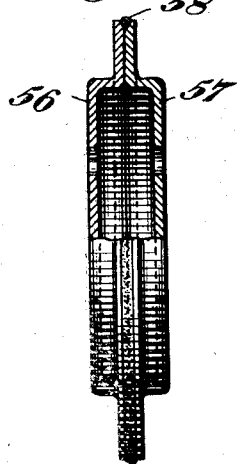
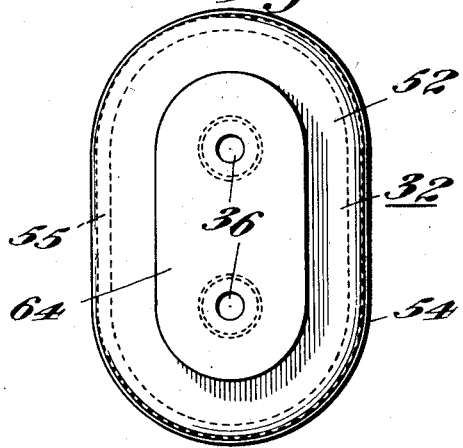
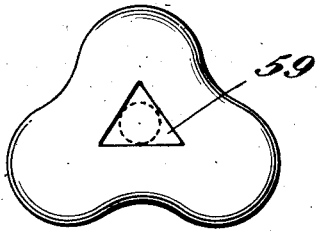
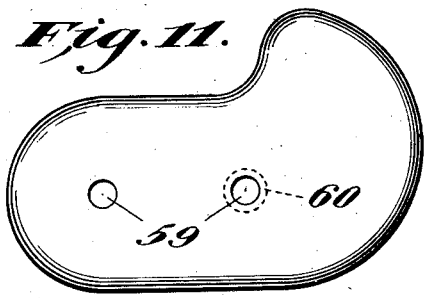
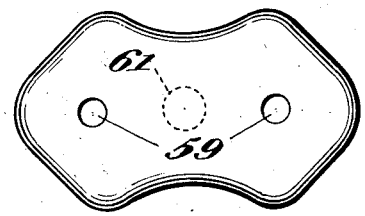
Inventor
George S. Comstock.
By R. S. A. Dougherty.
Attorney May 8, 1934. G. S. COMSTOCK 1,957,489
ARC WELDING MACHINE
Filed March 4, 1931 5 Sheets-Sheet 4
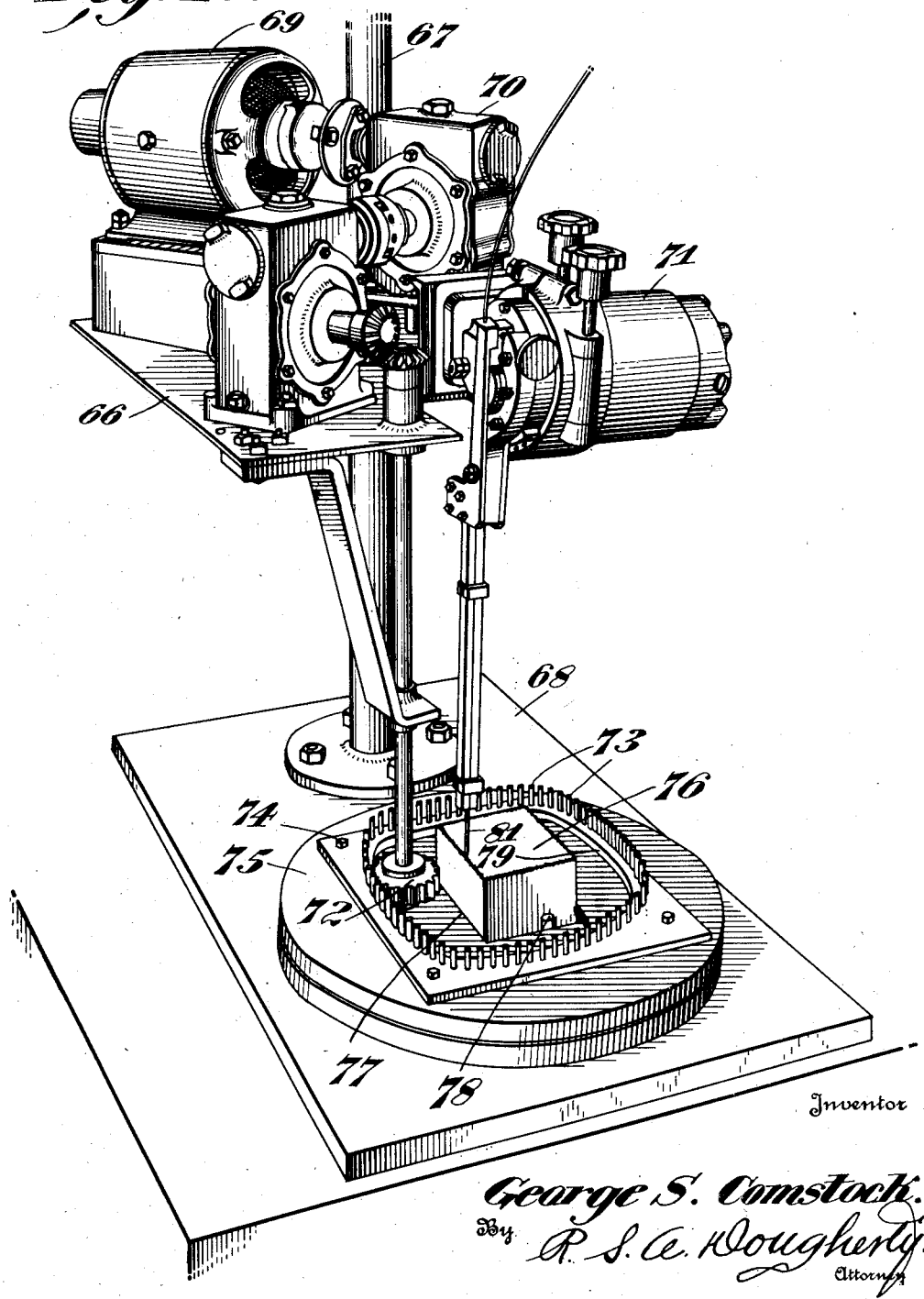

May 8, 1934.　　　G. S. COMSTOCK　　　1,957,489
ARC WELDING MACHINE
Filed March 4, 1931　　　5 Sheets-Sheet 5

Inventor

George S. Comstock.
By R. S. A. Dougherty
Attorney

Patented May 8, 1934

1,957,489

UNITED STATES PATENT OFFICE 1,957,489

ARC WELDING MACHINE

George S. Comstock, Steelton, Pa., assignor to Bethlehem Steel Company, a corporation of Pennsylvania Application March 4, 1931, Serial No. 519,928

30 Claims. (Cl. 219—8)

This invention relates to automatic welding machines and more particularly to automatic welding machines wherein means are provided for the electric arc welding automatically of work of irregular contour. Usually automatic welding machines are of a type similar to a lathe, a boring mill, or a drill press, on some rotating part of which, such as the face plate of the lathe, the work is mounted and the portion to be welded is moved relatively to a fixed electrode of a standard welding head. Such an arrangement has limited the automatic welding of work to pieces of a circular contour symmetrical about their axes of rotation due to the necessity of maintaining a constant rate of peripheral speed of welding at the point where the work comes in arc contact with the electrode of the electric welding head.

It is the particular object of my invention to provide a mechanism whereby work of irregular contour will be rotated at varying angular velocities to give a substantially constant rate of peripheral speed at the welding point on the work and to maintain at this point a substantially constant arc contact with the electrode of an electric welding head, whereby the welding of the work may be automatically accomplished in a most efficient and uniform manner and especially adapted for the economic production of multiple duplicate parts.

Another object of my invention is to provide a mechanism whereby an article is rotated and automatically welded at constant speed along a periphery that lies in a plane normal to the axis of rotation of the article and is variable in distance to said axis.

Another object of my invention is to provide a mechanism whereby an article may be automatically welded peripherally while rotating about a point other than its geometric center.

Another object of my invention is to provide apparatus to enable those skilled in the art to adapt an automatic welding device to existing designs of lathes, boring mills, and the like machines with a minimum amount of change and expense.

The manner in which the objects of my invention are accomplished will be understood from the following description taken in connection with the accompanying drawings, and the scope of my invention will be pointed out in the appended claims.

Figure 4:
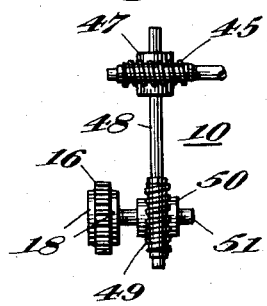
Figure 5:
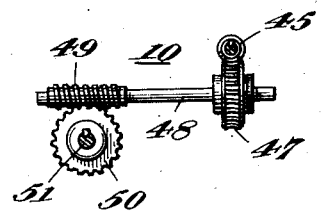
Figure 14:
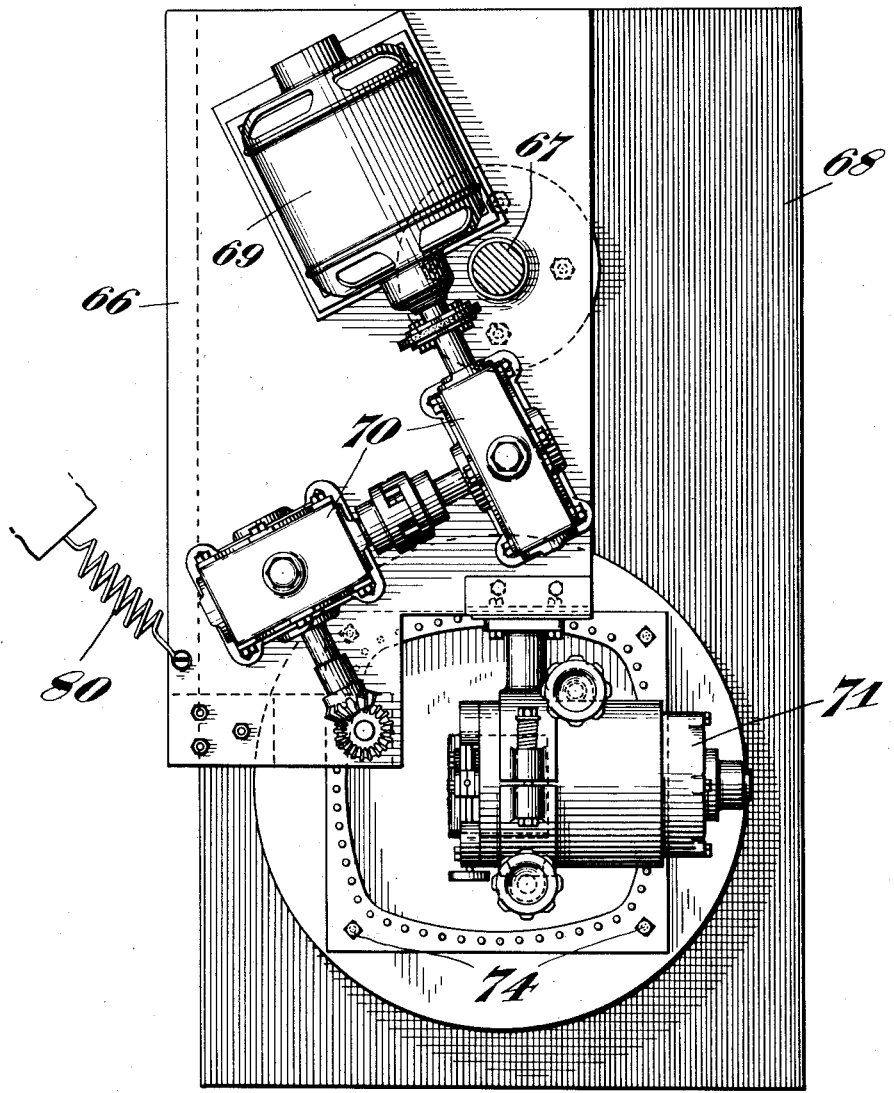

In the accompanying drawings, Fig. 1 is a perspective view of a machine embodying the essential features of my invention, wherein the welding is applied radially to the periphery of the work, and in which the gear drive and the standard welding head are mounted on separate pivoted platforms; Fig. 2 shows an end elevation of that portion of the machine indicated by the arrows in Fig. 1; Fig. 3 is a plan view of another form of the machine in which the gear drive and the welding head (not shown) are mounted on the same pivoted platform; Figs. 4 and 5 are details of a portion of the gear drive; Fig. 6 is a detail of another portion of the gear drive showing a special gear used for welding the work shown in Figs. 7, 8 and 9. Fig. 7 is an elevation and part section view of the work to be welded by the machine shown in Fig. 1; Fig. 8 is a plan view of the work shown in Fig. 7; Fig. 9 is an elevation and part section of another form of the work shown in Fig. 7; Figs. 10, 11 and 12 are plan views showing work of various contours that can be welded automatically in my device; Fig. 13 is a perspective view of a modification embodying the essential features of my invention, wherein the welding is applied normal to the plane of rotation of the work, and in which the gear drive and the standard welding head are mounted on the same pivoted platform; and Fig. 14 is a plan view of the machine shown in Fig. 13.

In Fig. 1 my invention is shown in a machine as arranged for automatically arc welding the work shown in Figs. 7, 8 and 9. As shown, the device is adapted to a standard lathe by removing the lathe gearing and the power drive and replacing the same with the gear train 10 and a variable speed electric motor drive 11, both being mounted on a pivoted platform 12. The platform 12 is pivotally mounted to the brackets 13 by suitable means such as the shaft 14, and the brackets 13 are rigidly attached to the bed plate 15 of the original lathe. The weight of the platform 12 together with its mounted parts, the gear train 10 and the motor 11 is further carried by the engagement of the shrouded gear 16 of the gear train 10 with the shrouded pin gear 17. The gear 16 is turned down at each end to a relatively large diameter, or to what I call "shrouds" 18. The pin gear 17 is formed of two plates 19 the outer periphery of which form shrouds with which the shrouds 18 of the gear 16 engage. The contour of the periphery of the plates 19 is practically identical to that of the work 32, the purpose of which will be described hereinafter. As shown on Fig. 6, between the plates 19 and attached thereto by suitable devices 21 is a hub plate 20 of a thickness slightly larger than the width of the gear 16; and spaced equally about the periphery of the plates 19 are the pins 22. These pins 22 are attached at the ends to the plates 19 and extend across the intervening space between the plates 19 and are so spaced therein as to form pin gear teeth for engaging with the teeth of the gear 16. The shrouds 18 and 19 of the gear 16 and the pin gear 17 engage in such a manner that they act to support the pivoted platform 12 and at the same time maintain the proper pitch distance between the gears 16 and 17.

The pin gear 17 is integrally mounted on the face plate shaft 23 by suitable means such as the key 24. The face plate shaft 23 is rotatably mounted in the bearing bracket 25 attached to the lathe bed plate 15. One end of the shaft 23 extends outwardly from the inner bearing of the bracket 25 and integrally mounted thereon is the face plate 26. The face plate 26 is of typical face plate design having slots 27 by means of which a fixture such as 28 may be attached. The fixture 28 as shown in Fig. 1 comprises the cam plate 29, brackets 30, and clamps 31. The clamps 31 may be of any suitable design that will permit of ready attachment and removal of the work 32. As shown in Fig. 1 the clamps 31 comprises the wedges 33, eye bolts 34, and plate 35. The eye-bolts 34 are attached to the brackets 30 and have an eye at their outer end which engages the wedges 33. As shown in Fig. 8 the work 32 is provided with holes 36 so spaced that the work 32 may be placed on the fixture 28 over the eye-bolts 34, and then clamped in place by the plate 35 and wedges 33. The position of the eye-bolts 34 on the brackets 30 and the position of the holes 36 in the work 32 are such that when the work 32 is clamped in place on the fixture 28 the axis of the contour of the work 32 is coaxial with the same axis of the contour of the pin gear 17. The cam plate 29 has substantially the same peripheral contour and dimensions as the periphery of the shrouds of the pin gear 17, and is positioned relatively with the pin-gear 17 with their axes of contour co-axial. In engagement with the periphery of the cam plate 29 is the roller 37 rotatably mounted on an extension 38 of the platform 39. The roller 37 is of the same outside diameter as is the shrouding 18 on the gear 16, and the roller 37 is normally positioned co-axially with the gear 16. The platform 39 is pivotally mounted to the bracket 40 by suitable means such as the bolt 41 and this bolt 41 is co-axial with the shaft 14 of the platform 12. The bracket 40 as shown in Fig. 1 is attached to the lathe bed plate 15, but where a wide variety of work is to be welded it would better be attached to the regular travel carriage of the lathe so as to be more readily positioned relatively to the work. The pivoted platform 39 mounts the electrode reel 42 and the standard welding head 43. The weight of the pivoted platform 39 together with its mounted parts, the electrode reel 42 and the standard welding head 43, acts to maintain the engagement of the roller 37 with the cam plate 29.

The standard welding head 43 is so positioned on the platform 39 that the electrode 44 at its point of arc contact with the work 32 is approximately in the same straight line extended from the point of contact of the shrouds 18 with the shrouds 19 and through the point of contact of the roller 37 with the cam plate 29.

The gear train 10 of Figs. 1 and 2 is shown diagrammatically in Figs. 4 and 5. The worm 45 is coupled direct to the shaft of the motor 11 by means of the coupling 46 shown in Fig. 1. The worm 45 engages the worm-wheel 47 fixedly mounted on the shaft 48 of the worm 49 which engages the worm-wheel 50. The worm-wheel 50 is fixedly mounted on the shaft 51. The shrouded gear 16 is also fixedly mounted on the shaft 51. The gear train 10 is so designed as to reduce the speed of the motor 11 to give a peripheral speed to the shrouding of the gear 16 equal to the rate of welding speed desired on the work.

The operation that is performed by the device herein described on the work 32 is that of joining together the two halves 52 and 53 (Fig. 7) by automatically arc welding their peripheries 54. The work 32 may be of the character as shown in Fig. 7, in which the two halves each comprise multiple parts previously assembled, or the work may be of the character shown in Fig. 9, which consists of two halves of formed plate construction. In either case the work is welded along its periphery.

The type of welded joint may be varied to suit conditions; that shown in Fig. 7 is preferred where in addition to the joining of the two halves 52 and 53 it is also required that the finished work be able to withstand hydraulic pressure without leakage. In this design the two halves 52 and 53 are assembled with an inserted ring 55 between in such a way that a space is left between the edges of the halves 52 and 53, and this space is then filled in by welding the welding electrode which acts to join the halves 52 and 53 and the ring 55 into one, thereby making a very strong and efficient leak proof joint. In Fig. 9 another form of welded joint is shown in which the halves 56 and 57 are slightly beveled on the inner edge of their peripheries, which forms, when the halves are assembled, a V groove that is then filled in by welding the welding electrode, as shown at 58.

It will be apparent to one skilled in the art that considerable variation may be made without departing from the spirit of my invention. In practice it might be found desirable with certain classes of work to depart from the design which I have shown and described in the preferred form. It is apparent that the gears 16 and 17 may be relatively larger or smaller than the roller 37 and the cam plate 29 without affecting the relative angular velocity of the work 32, and this feature may be taken advantage of when it is desired to change the peripheral rate of welding speed without changing the speed of the power drive. In other words, the peripheral speed may be changed without changing the relative angular velocity of the work 32.

It is also apparent that the gear 17 may be placed anywhere in the gear train, since its function is to adjust the final angular velocity to a constant rate of peripheral speed, and since the angular speed may be transmitted thereafter through any combination of standard gearing, wide variations in contour may be provided for by making the gear 17 and the cam plate 29 proportionally of the same contour. Certain variations of contour possible of being welded in my device, I have shown in Figs. 10, 11 and 12, wherein the holes 59 may be of any suitable design that will act as driving and clamping means; and the center of rotation of the work may be off center as at 60 in Fig. 11, or it may be at the center of symmetry as at 61 in Fig. 12.

I have shown in Figs. 1 and 2 the preferred form of my device when the work is required to be welded radially to the periphery, or at an angle to the plane thereof. In this form it is more adaptable for a wide range of work in that by having the means for establishing the angular velocity of the work separate from the means that established the peripheral speed and the constant arc of welding there is provided a certain possible flexibility of adjustment between the two aforesaid means. For simple and nearly circular contours and particularly for use for a single type of work this flexibility may not be necessary and it will be more economical to manufacture my device as shown in Fig. 3.

In Fig. 3 I have combined the platforms 12 and 39 of Fig. 1 into one platform 62 which is pivotally mounted on the bolt 63 corresponding to the pivotal means 14 and 41 of Figs. 1 and 2. On this single platform I mount the motor, the gear train, the electrode reel (not shown), and the standard welding head (not shown), etc., equivalent to the parts, 11, 10, 42 and 43 respectively of Fig. 1. In doing this the roller 37 and the cam plate 29 are dispensed with as unnnecessary, since the gears 16 and 17 with their shrouds 18 and 19, respectively, perform the combined functions of establishing the angular velocity, rate of peripheral speed, and constant arc. In all other respects the device shown in Fig. 3 is identical to that shown in Figs. 1 and 2.

In Figs. 13 and 14 I have shown a preferred form of my device when the work requires the welding to be applied normal to the plane in which it rotates or at an angle thereto. This modification may be applied to a boring mill type of machine. Here the platform 66 is pivotally mounted on the vertical spindle 67 attached to the bed plate 68. The pivoted platform 66 mounts the motor 69, the gear drive 70, and the standard welding head 71. The gear drive terminates in the gear 72 which corresponds to the gear 16 of Fig. 1, and is shrouded on its lower end in a similar manner as is gear 16 already described. The gear 72 is engaged with the pin gear 73 which is attached by suitable means 74 to the face-plate 75. The face-plate 75 is rotatably mounted on the bed plate 68 and is driven by the gear 72. The face-plate 75 corresponds to the face-plate 26 of Fig. 1 and acts as a workholder for the work 76. As shown in Fig. 13 the work 76 (a square hollow-box) fits in a recess 77 in the face-plate 75 and is held by any suitable means such as wedge 78.

The pin gear 73 has a shrouded edge 79 which engages the shrouded lower end of the gear 72. The tension spring 80 shown in Fig. 14 is so attached to the platform 66 and any rigid part so as to maintain the gear 72 in engagement with the pin gear 73, and is therefore similar in action to the weight of the pivoted platform 12 and its attached parts of Fig. 1. The contour of the pin gear 73 is determined by the combined results of the rotating face-plate 75 and the tangentially moving electrode 81, so as to give the particular path of welding desired, which in the case of the article to be welded by the apparatus illustrated in Fig. 13 is of square formation. In function and operation the modification shown in Figs. 13 and 14 is similar to that of the machine shown in Figs. 1 and 3 and need not be further described.

In view of their well known and widespread use and application it has not been considered necessary to show in detail the electrical connections to the electric motor and the standard electric arc welding head, nor details of the motor drive, the electrode reel, or the standard welding head. It is only necessary to state that the aforesaid electrical connections should permit of flexible movement in their attachment and that the standard welding head should be provided with means for initially adjusting the arc of contact and for automatic feeding of the electrode.

Though I have in the aforesaid description specified an electric motor drive it is apparent to one skilled in the art that any motor drive to the gear train may be utilized that permits of a flexible connection to the source of power. It is also desirable that the motor drive be of a variable speed type in order to obtain adjustments in the rate of welding. Also in the use of the word "periphery" I define it as that line along which the welding takes place, and not necessarily as the outer line of the part as a whole. For example, had it been desirable, the work 32 could be welded with my device along the periphery of the plate 64 as indicated at 65 in Fig. 7, utilizing the same mechanism as for the welding of the periphery 54 but changing the initial speed of the motor 11. The term "a gear of irregular form" wherever used herein is to be taken to mean a gear having a pitch line variable in distance in relation to the axis about which it rotates.

It will be seen from the foregoing that I have devised a novel and simple mechanism particularly adapted for the automatic welding of work of irregular contour.

While I have shown my invention in a preferred form, and certain modifications to the same, it will be obvious to those skilled in the art that it is not so limited, but is suseceptible of various other changes and modifications without departing from the spirit thereof, and I desire therefore, that only such limitations shall be placed thereupon as are imposed by the prior art or as are specifically set forth in the appended claims.

Having thus described my invention what I claim as new and desire to secure by Letters Patent is:

1. In a welding machine for welding an article along a periphery variable in relation to the axis about which it rotates while being welded, a welding means, means for rotating the work at an angular velocity of rotation to give an approximately constant rate of peripheral welding relative to a point at which the weld is effected, and means to maintain a substantially constant operative relation between the welding means and said point.

2. In a welding machine wherein a welding head is arranged to maintain a point of arc contact on the periphery of a piece of work of irregular contour, means to rotate said work at a variable angular velocity, means coacting with the first mentioned means by which said periphery is caused to move relatively to said point of arc contact at an approximately uniform rate of speed, and means to maintain a constant welding arc at said point of arc contact.

3. In a welding machine wherein a welding head is arranged to maintain a point of arc contact on the periphery of a piece of work, means to rotate said work at a variable angular velocity, said periphery being variable relative to the axis of rotation of said work, means co-acting with the first mentioned means by which said periphery is caused to move relatively to said point of arc contact at an approximately uniform rate of speed, and means to maintain a constant welding arc at said point of arc contact.

4. In an arc welding machine wherein a welding head is arranged to maintain a point of arc contact on the periphery of a piece of work, means to rotate said work about an axis other than its geometric center at a variable angular velocity, means coacting with the first mentioned means by which said periphery is caused to move relatively to said point of arc contact at an approximately uniform rate of speed, and means to maintain a constant welding arc at said point of arc contact.

5. In an automatic arc welding machine wherein a welding head is arranged to maintain a point of arc contact on the periphery of a piece of work, said periphery being variable relative to the axis of rotation of said work, means to rotate said work at a variable angular velocity, means coacting with the first mentioned means by which said periphery is caused to traverse said point of arc contact at an approximately uniform rate of speed, and means to maintain a constant welding arc at said point of arc contact.

6. In an automatic arc welding machine wherein a welding head having an electrode is arranged to maintain a point of arc contact on the periphery of a piece of work, means to rotate said work at a variable angular velocity, said periphery being variable relative to the axis of rotation of said work, means co-acting with the first mentioned means by which said periphery is caused to move relatively to said point of arc contact at an approximately uniform rate of speed, and means to move the electrode of said welding head radially in accordance with the variation of the distance of the periphery at the point of arc contact to said axis during the rotation of the work.

7. In an arc welding machine wherein a welding head is arranged to maintain a point of arc contact on the periphery of a piece of work, means to rotate said work at a variable angular velocity, said periphery being variable relative to the axis of rotation of said work, means coacting with the first mentioned means by which said periphery is caused to move relatively to said point of arc contact at an approximately uniform rate of speed, and means to maintain the electrode of said welding head at a substantially constant distance from the said periphery during the rotation of the work.

8. In an automatic arc welding machine wherein a welding head having an electrode is arranged to maintain a point of arc contact on the periphery of a piece of work, means to rotate said work about an axis eccentric with reference to its geometric center at a variable angular velocity, means coacting with the first mentioned means to move said periphery relatively to said point of arc contact at an approximately uniform rate of speed, and means to maintain the electrode of said welding head at a substantially constant distance from the said periphery during the rotation of the work.

9. In an arc welding machine wherein a welding head having an electrode is arranged to maintain a point of arc contact on the periphery of a piece of work, means to rotate said work at a variable angular velocity, said periphery being variable relative to the axis of rotation of said work, means co-acting with the first mentioned means by which said periphery is caused to traverse said point of arc contact at an approximately uniform rate of speed, and means to maintain the electrode of said welding head at a substantially constant distance from the said periphery during the rotation of the work.

10. In an arc welding machine wherein a welding head having an electrode is arranged to maintain a point of arc contact on the periphery of a piece of work, means to rotate said work about an axis eccentric with respect to its geometric center at a variable angular velocity, means coacting with the first mentioned means by which said periphery is caused to move relatively to said point of arc contact at an approximately uniform rate of speed, and means to move the electrode of said welding head radially in accordance with the variation of the distance of the periphery at the point of arc contact to said axis during the rotation of the work.

11. In a welding machine wherein a welding device is arranged to maintain a point of welding contact on the periphery of a piece of work, means to rotate the work at a variable angular velocity, said periphery being variable relative to the axis of rotation of said work, means co-acting with the first mentioned means by which said periphery is caused to traverse said point of welding contact at an approximately uniform rate of speed, and means to move the welding device radially in unison with the angular movement of the work.

12. A welding machine for welding an article along a periphery variable in relation to the axis about which it rotates while being welded, comprising a welding device, means to rotate the work at a variable angular velocity, means coacting with the first mentioned means for traversing the periphery relative to the device at a uniform rate of traverse, and means for maintaining the relative position of the device with respect to the periphery.

13. A welding machine for welding an article along a periphery variable in relation to the axis about which it rotates while being welded, comprising a welding device on a movable support, means to rotate the work at a variable angular velocity means for actuating said support to move radially in unison with the tangentially moving periphery, and means co-acting with the first mentioned means for maintaining a substantially uniform rate of tangential speed of the periphery relative to the effective point of welding of said welding device.

14. A welding machine for welding an article along a periphery that is variable in relation to the axis about which it rotates while being welded, comprising a rotatable work supporting means, a welding device on a movable support, a cam mounted on the work supporting means and engageable with the movable support for the purpose of maintaining a constant predetermined relation betwen the welding device and the said periphery, and means co-acting with the said cam to rotate the work supporting means at an angular velocity to give a substantially constant rate of tangential speed to the periphery.

15. A welding machine for welding an article along a periphery that lies in a plane normal to, and is variable in relation to, the axis about which it rotates while being welded, comprising a rotatable work supporting means, a welding device on a movable support, a cam mounted on the work supported means and engageable with the movable support for the purpose of maintaining a constant predetermined relation between the welding device and the said periphery, a gear mounted on the work supporting means, the periphery of said cam and the pitch circle of said gear having substantially the same contour proportionally and identically orientated about their axes of rotation as the periphery being welded, and means to rotate the work supporting means comprising a motor and a gear train mounted on a movable support and in engagement with the first mentioned gear.

16. A welding machine for welding an article along a periphery that lies in a plane normal to, and is variable in relation to, the axis about which it rotates while being welded, comprising a rotatable work supporting means, a welding device on a movable support, a cam mounted on the work supporting means and engageable with the movable support for the purpose of maintaining a constant predetermined relation between the welding device and the said periphery, the periphery of said cam having substantially the same contour proportionally and identically orientated about its axis of rotation as is the periphery being welded, a driving means on said work supporting means, and means to rotate the work supporting means comprising a motor means and a motor driven gear mounted on a movable support, a gear train engaged with said driving means and including a gear having its pitch circle of substantially the same contour proportionally and identically orientated about its axis of rotation as is the periphery being welded, and means for maintaining the last mentioned gear in engagement with the said motor driven gear.

17. A welding machine for welding an article along a periphery that lies in a plane normal to, and is variable in relation to, the axis about which it rotates while being welded, comprising a rotatable work supporting means, a welding device on a movable support, a cam mounted on the work supported means and engageable with the movable support for the purpose of maintaining a constant predetermined relation between the welding device and the said periphery, a gear mounted on the work supporting means, the periphery of said cam and the pitch circle of said gear having substantially the same contour proportionally and identically orientated about their axes of rotation, and means to rotate the work supporting means comprising a motor and a gear train mounted on a movable support and in engagement with the first mentioned gear.

18. A welding machine for welding an article along a periphery that lies in a plane normal to, and is variable in relation to, the axis about which it rotates while being welded, comprising a rotatable work supporting means, a welding device on a movable support, a cam mounted on the work supporting means and engageable with the movable support, the periphery of said cam having suitable contour to maintain a constant predetermined relation between the welding device and said periphery during the rotation of the work, a driving means on said work supporting means, and means to rotate the work supporting means comprising a motor means and a motor driven gear mounted on a movable support, a gear train engaged with said driving means and including a gear having its pitch circle of substantially the same contour proportionally and identically orientated about its axis of rotation as is the periphery being welded, and means for maintaining the last mentioned gear in engagement with the said motor driven gear.

19. In a welding machine, a welding head means to move the work to be welded relatively to said welding head, means actuated by said work moving means to move said welding head, and means including gearing to regulate the speed of motion of the work as a body in accordance with the movement of the welding head.

20. In a welding machine, a welding device, means to rotate the work with a varying degree of angular velocity as a body, and means co-acting with the first mentioned means including gearing to move the welding device in accordance with the change in degree of speed aforesaid.

21. In a welding machine, a welding device and means to rotate the work to be welded relatively to said welding device at a variable angular velocity, said means including a gear of elliptical form.

22. In a welding machine, a welding device and means to rotate the work to be welded relatively to said welding device at a variable angular velocity, said means including a gear of irregular form.

23. In a welding machine, a welding device, and means to rotate the work surface to be welded relatively to said welding device at a variable angular velocity, said means including a gear of similar shape to said surface and having portions of its pitch line disposed with reference to its central axis at distances which vary with respect to one another.

24. In a welding machine, a welding device, and means to rotate the work surface to be welded relatively to said welding device at a variable angular velocity, said means including a gear having portions of its pitch line disposed with reference to its central axis at distances which vary with respect to one another.

25. In a welding machine, a movable welding device, a rotatable member for supporting the work to be welded, means operated by said rotatable member to move the welding device in conformity with the contour of said work, and means co-acting with the first mentioned means to rotate said member at variable angular velocity in conformity with the contour of said work.

26. In a welding machine, a movable welding device, a rotatable work support, means functioning simultaneously to move said device and to rotate said support, and means including gearing to vary the rate of movement of one of the last two mentioned elements at about the time said simultaneous movement is occurring.

27. In a welding machine, a welding device, a rotatable member, a member for moving said device mounted on said rotatable member and provided with a surface of similar contour to the surface of the work to be welded, and means to drive said rotatable member including a member having an element of similar contour to the surface of the work to be welded.

28. In a welding machine, a welding device, a rotatable cam member having a surface of similar contour to the surface of the work to be welded upon which said device is supported, a support for said work, and means to rotate said cam member and said support correlatively.

29. In a welding machine, a welding device, a rotatable cam member having a surface of similar contour to the surface of the work to be welded to move said device, a rotatable work support, a gear having a force transmitting portion of similar contour to said cam surface for rotating said support, and means for driving said gear and said cam member correlatively.

30. Circumferential seam welding apparatus, comprising means for rotatably supporting non-circular work, means for rotating the work at uniform circumferential speed, a welding head, and means for supporting the welding head in constant relation to the circumference.

GEORGE S. COMSTOCK.